Aug. 26, 1969  J. GELB  3,463,027
ELECTROMAGNETIC ACTUATED TWO SPEED DRIVE MECHANISM
Filed Nov. 16, 1967  2 Sheets-Sheet 1

*John Gelb*
INVENTOR.

Aug. 26, 1969  J. GELB  3,463,027

ELECTROMAGNETIC ACTUATED TWO SPEED DRIVE MECHANISM

Filed Nov. 16, 1967  2 Sheets-Sheet 2

INVENTOR.

United States Patent Office 3,463,027
Patented Aug. 26, 1969

3,463,027
ELECTROMAGNETIC ACTUATED TWO SPEED DRIVE MECHANISM
John Gelb, Tarzana, Calif., assignor, by direct and mesne assignments, of forty-five percent to Allan Friedman and ten percent to Marvin Friedman, both of Los Angeles, Calif.
Filed Nov. 16, 1967, Ser. No. 683,510
Int. Cl. F16h 3/08
U.S. Cl. 74—365                            4 Claims

ABSTRACT OF THE DISCLOSURE

A two speed drive mechanism having an input drive member in driving engagement with an idler assembly that drives a second stage drive member. An output shaft extends through and is rotatably mounted in the hollow hub of the second stage drive member. A pair of armature disks are slidably mounted and keyed to the output shaft to impart rotary motion thereto. A pair of electromagnets attached to the housing and positioned between the pair of armature disks. When the electromagnets are de-activated no rotary motion is transmitted from the input drive member to the output shaft. When one of the electromagnets is activated it causes frictional engagement of one of the armature disks with the input drive mechanism resulting in direct drive of the output shaft. When the other electromagnet is activated it causes frictional engagement of the other armature disks with the second stage drive member resulting in driving the output shaft through the idler assembly at a gear ratio determined by the gearing of the idler assembly gear train.

---

This invention relates to a novel and useful electromechanical mechanism to selectively engage either of two fixed gear ratios and to provide thereby two output speeds. A variation of this concept provides, in addition to two output speeds, an on-off function. With the increased emphasis on automatically controlled operational sequences, a device such as described hereunder becomes increasingly important as requirements for electrical control of mechanical functions increase. To this end, a simple, basic, integrated electromechanical mechanism is required. These objectives have been achieved by the invention described. In addition to rapid gear ratio changes, this mechanism also performs an on-off clutch function, thereby eliminating additional design elements. The following descriptions present both an embodiment of a two speed, selectively engageable drive, as well as an embodiment of a two speed drive, providing in addition to two speed selections, an on-off function as well. This invention relates to a basic design concept, which can be expanded to cover multiples of the basic arrangement. It is to be understood that a friction drive could be substituted for the gear drive depicted herein, without in any way changing the basic design concept and function of this device.

Other objects, advantages and novel features of the invention will become apparent from the following detailed description of the invention when considered in conjunction with the accompanying drawings wherein.

Figure 1:
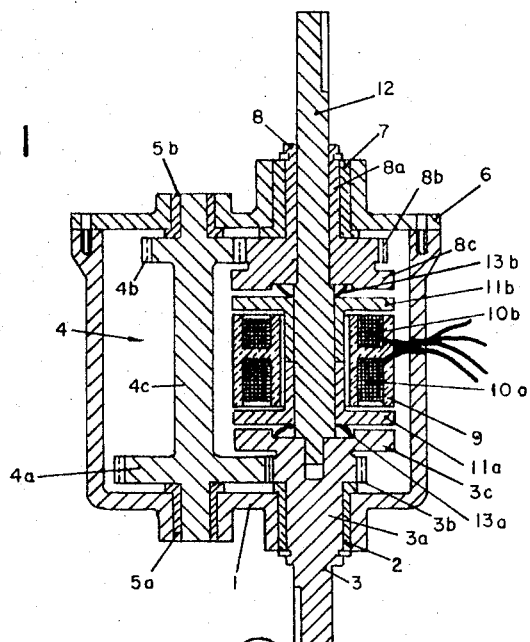
FIGURE 1 is a sectional view of one embodiment of the present invention.
Figure 2:
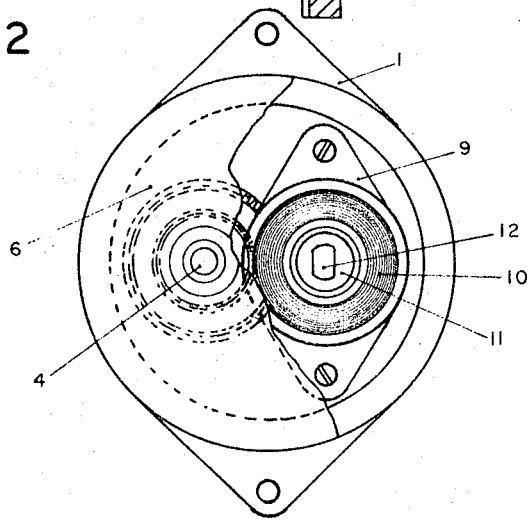
FIGURE 2 is an end view, partly in section, of FIGURE 1.

Referring to FIGURES 1 and 2, the two speed drive mechanism of the present invention comprises a housing with an integral end plate 1 that carries bearing 2. Mounted in the bearing is the input drive member 3 comprising of a hub 3a, a gear 3b and a clutch disk 3c combination. The input drive member 3 is positioned in driving engagement with the idler gear assembly 4. The idler gear assembly comprises two gears 4a and 4b, mounted on a common, coaxial shaft 4c. The idler gear assembly 4 rotates in bearings 5a and 5b, respectively located in the housing end plate 1 and the housing cover 6. Mounted in bearing 7 in the housing cover 6 is the second stage drive member 8. The second stage drive member comprises a hollow hub 8a, a gear 8b and a clutch disk 8c. Gear 8b of the second stage drive member 8 is in driven engagement with gear 4b of the idler assembly 4. Coaxially arranged and interposed between the input drive member 3 and the second stage drive member 8 is a stationary electromagnet structure. This electromagnet structure is composed of a pole ring 9 containing two U shaped sections, oriented with their operating pole gaps toward the input drive member 3 and the second stage drive member 8, respectively. Located in the U shaped annular cavities are two electrically independent wire wound coils 10a and 10b. Concentric with the pole ring 9 and interposed between the input drive member 3 and the second stage drive member 8 are two round flat faced armature disks 11a and 11b with cylindrical projections extending into the center bore of the pole ring 9. Each of these armature disks 11a and 11b are provided with a double D shaped through bore. The small end of these armature disks are in contacting relationship with each other. The output shaft 12 with a double D shaped center section is coaxially arranged between the input drive member 3 and the second stage drive member 8. The output shaft 12 is piloted in the input drive member 3 and extends through the bore of the armature disks 11a and 11b and is supported in the hollow hub of the second stage drive member 8. Shoulders on the output shaft 12, bearing against the pilot bearing bore in the input drive member 3 and the through bore of the second stage drive member 8, locate the output shaft in an axial position. Flat spring washers 13a and 13b, positioned between the armature disks 11a and 11b and the clutch plates of the input drive member 3 and the second stage member 8, hold the armatures 11a and 11b in a deactivated position. Operating clearances are provided between the clutch disk 8c of the second stage drive stage drive member 8, the armature disk 11b and the pole ring adjacent to the armature disk. Identical clearances are provided between the clutch 3c of the input drive member 3, the armature disk 11a and the adjoining pole ring surface.

The operation of the mechanism shown in FIGURES 1 and 2 is as follows: The input drive member 3, being driven by a rotating source of power, drives the idler gear assembly 4 and the second stage drive member 8 by virtue of the geared relationship between these components. When de-activated, the output shaft 12, being piloted in the input drive member 3 and extending through and rotatably mounted in the armature disks 11a and 11b and also through the hub of the second stage drive member 8, remains stationary while the input drive member 3, the idler gear assembly 4 and the second stage drive member 8 are being driven. In order to obtain torque transmittal to the output shaft 12 from the input drive member 3, the coil 10b in the pole ring 9 is energized. A magnetic force is then created which attracts armature disk 11b in an axial direction towards the pole ring 9. The armature disk 11b, abutting against armature disk 11a, slides along the output shaft 12 toward the clutch disk 3c of the input drive member 3. Upon compressing the spring washer 13a, the armature disk 11a comes into frictional engagement with the clutch face of clutch disk 3c and effects torque transmittal to the output shaft 12. The ratio between input drive member 3 and output shaft 12 will now be 1:1. In order to effect engagement of the alternate gear ratio coil 10b is de-energized and coil 10a is energized. Upon energizing coil 10a in the pole ring 9 a magnetic force is created which attracts armature disk 11a in an axial direction toward the pole ring 9. The armature disk 11b, abutting against armature disk 11a, slides along output shaft 12 toward the clutch disk 8c of the second stage drive member 8. Upon compressing the spring washer 13b, the armature disk 11b comes into frictional engagement with the clutch face of clutch disk 8c and effects torque transmittal to the output shaft 12. The ratio between input drive member 3 and output shaft 12 will now be the combined gear ratio between input drive member 3, idler gear assembly 4 and second stage drive member 8. With both coils 10a and 10b deenergized, the spring washers 13a and 13b will hold both armature disks 11a and 11b in a centered position, away from the clutch faces of the input drive member 3 and the second stage drive member 8. The input drive member 3, driven from a source of rotational power will rotate and drive idler gear assembly 4 and second stage drive member 8. No rotation will be imparted to the output shaft 12. The device is now acting as an on-off clutch.

Figure 3:
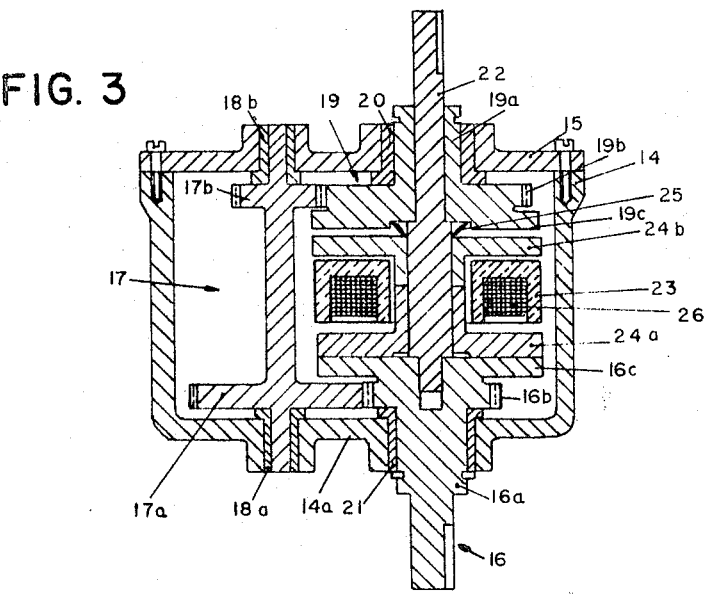
FIGURE 3 is a sectional view of another embodiment of the present invention.
Figure 4:
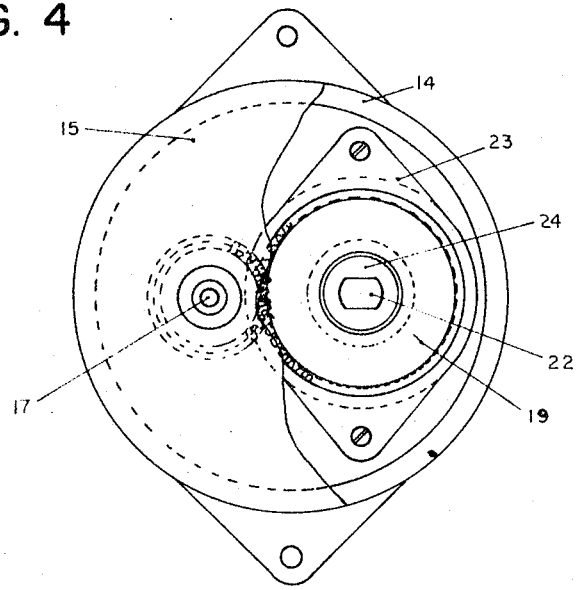
FIGURE 4 is an end view, partly in section, of FIGURE 3.

In FIGURES 3 and 4 is illustrated another embodiment of the present invention.

In this embodiment the mechanism has a housing 14 with an integral end plate 14a that carries in a bearing 21 the input drive member 16. The input drive member 16 consists of a hub 16a a gear 16b and a clutch disk 16c. The input drive member 16 is in driving engagement with an idler gear assembly 17. The idler gear assembly consists of two gears 17a and 17b coaxially mounted on a shaft. Said idler gear assembly 17 rotates on bearing 18a located in end plate 14a and bearing 18b mounted in the housing cover 15. Also mounted in the housing cover 15 is the second stage drive member 19. The second stage drive member 19 revolves in bearing 20 which is mounted in housing cover 15. The second stage drive member comprises a hollow hub 19a, a gear 19b and a clutch disk 19c. Gear 17b of the idler gear assembly 17 is in driving relationship with gear 19b the second stage drive member 19. Coaxially interposed between input drive member 16 and second stage drive member 19 is a stationary electromagnet structure. This structure consists of a circular pole ring 23 with a U shaped cross section. Mounted in the U shaped annular cavity is a wirewound coil 26. Two round, flat faced armature disks 24a and 24b are coaxially positioned within the pole ring 23. The armature disks 24a and 24b have cylindrical extensions projecting through the center bore of the pole ring 23. Armature disks 24a and 24b have a double D shaped center bore. Piloted in input drive member 16 and extending through the center bore of the armature disks is the output shaft 22 with a double D shaped center section. The output shaft 22 extends through the second stage drive member 19. A conical spring 25 biases the armature disks 24a and 24b into rotation transmitting engagement with the clutch disk 16c of the input drive member 16.

The operation of the mechanism shown in FIGURES 3 and 4 is as follows:

The input drive member 16 is in driving engagement with the idler gear assembly 17. The idler gear assembly 17 is driving the second stage drive member 19. The input drive member 16, being driven by a rotating source of power, sets the aforementioned components into rotary motion. The input drive member 16 will rotate at the same rotational speed as the drive source. The second stage drive member 19 will rotate at a rotational speed that is determined by the combined ratio of the input drive member 16, the idler gear assembly 17 and the second stage drive member 19. Speed selection is effected by slidingly displacing the armature disks 24a and 24b along the centrally located output shaft 22. The output shaft 22 is piloted in the input drive member 16 and extends through the armature disks 24a and 24b and through the second stage drive member 19. The center-section of the output shaft 22 possesses a double D profile. The armature disks 24a and 24b have a corresponding double D bore. Therefore they are free to slide along the axis of the output shaft 22 but can transmit rotational force to said output shaft 22. Coaxially arranged around the output shaft 22 and the armature disks 24a and 24b is a stationary electromagnet. In the deactuated position a spring 25, located around said output shaft 22 between second stage drive member 19 and armature disk 24b, holds armature disk 24a in torque transmitting contact with input drive member 16. Therefore input drive member 16 transmits rotation to armature disk 24a and the output shaft 22. Upon energization of the coil 26 in the pole ring 23 the armature disk 24a is attracted to the pole ring surface, compressing the spring 25 and pressing the armature disk 24b into rotation transmitting contact with clutch disk 19c of the second stage drive member 19. The second stage drive member 19 will now drive armature disk 24b and output shaft 22 at a speed determined by the combined ratio of the input drive member 16, the idler gear assembly 17 and the second stage drive member 19. The torque transmittal between armature disks and the drive members can be effected either, by pure frictional means or by mechanical engagement in the shape of face serrations, engaging dogs or similar mechanical means.

What I claim is:

1. A two speed drive mechanism comprising:
   a housing having first and second ends;
   an input drive member having a hub, a gear and a clutch disk;
   said input drive member rotatably mounted in a first bearing at said first end of said housing with said hub drive gear and clutch disk extending into said housing;
   an idler gear assembly rotatably mounted in said housing;
   said idler gear assembly having first and second idler gears rigidly connected by a common idler shaft;
   the axis of said idler shaft being parallel to the axis of said input drive member;
   said drive gear engaging said first idler gear;
   a second stage drive member having a hollow hub carrying a drive gear and a clutch disk;
   said second stage drive member rotatably mounted in a second bearing at said second end of said housing with said hollow hub, drive gear and clutch disk extending into said housing;
   the axis of said second stage drive member being in longitudinal alignment with the axis of said input drive member;
   said drive gear of said second stage drive member engaging said second idler gear;
   an output shaft extending through and rotatably mounted in said hollow hub of said second stage drive member and having a first end and a center section within said housing and between said first clutch disk and said second clutch disk;
   first and second armature disks slidably mounted on the center section of said output shaft; and
   electromagnet means rigidly attached to said housing and surrounding said center section and magnetically in operable relation with said first and second armature disks.

2. The device of claim 1 wherein:
   said first end of said output shaft being rotatably mounted in the hub of said input drive member.

3. The device of claim 1 wherein:
   said electromagnetic means comprises first and second electromagnets with said first electromagnet adjacent said first armature disk and said second electromagnet adjacent said second armature disk.

4. The device of claim 3 wherein:

a first spring mounted between said first armature disk and the clutch disk of said input drive member to bias said first armature disk and said clutch disk of said input drive member away from each other; and a second spring mounted between said second armature disk and the clutch disk of said second stage drive member to bias said second armature member and said clutch disk of said second stage drive member away from each other.

References Cited

UNITED STATES PATENTS

| | | | |
|---|---|---|---|
| 1,268,777 | 6/1918 | Willis | 74—365 X |
| 2,209,776 | 7/1940 | Kiekhaefer | 192—48.2 X |
| 2,632,336 | 3/1953 | Luketa | 74—365 X |
| 2,647,601 | 8/1953 | Malick | 192—84 |
| 2,862,590 | 12/1958 | Schuman | 192—84 |
| 2,868,340 | 1/1959 | Wilson et al. | 74—365 X |
| 2,912,087 | 11/1959 | Kron et al. | 192—48.2 |
| 3,138,232 | 6/1964 | Gerber et al. | 192—48.2 |

DONLEY J. STOCKING, Primary Examiner

T. C. PERRY, Assistant Examiner

U.S. Cl. X.R.

192—18, 48, 84